US010183336B2

(12) United States Patent
Henke (10) Patent No.: US 10,183,336 B2
(45) Date of Patent: Jan. 22, 2019

(54) POWER CHUCK (71) Applicant: Volker Henke, Oyten (DE)

(72) Inventor: Volker Henke, Oyten (DE)

(73) Assignee: HVM Technology GmbH, Oyten (DE)

(*) Notice: Subject to any disclaimer, the term of this patent is extended or adjusted under 35 U.S.C. 154(b) by 28 days.

(21) Appl. No.: 15/527,231

(22) PCT Filed: Dec. 3, 2015

(86) PCT No.: PCT/EP2015/078464
§ 371 (c)(1),
(2) Date: May 16, 2017

(87) PCT Pub. No.: WO2016/087563
PCT Pub. Date: Jun. 9, 2016

(65) Prior Publication Data
US 2017/0348776 A1 Dec. 7, 2017

(30) Foreign Application Priority Data

Dec. 4, 2014 (EP) .................................. 14196237

(51) Int. Cl.
*B23B 31/177* (2006.01)
*B23B 31/16* (2006.01)

(52) U.S. Cl.
CPC ........ *B23B 31/16258* (2013.01); *B23B 31/16* (2013.01); *B23B 2231/22* (2013.01);
(Continued)

(58) Field of Classification Search
CPC .......... B23B 31/1607; B23B 31/16066; B23B 31/16141; B23B 31/16145;
(Continued)

(56) References Cited

U.S. PATENT DOCUMENTS 1,864,423 A    6/1932 Forkardt
1,909,658 A *  5/1933 Casler .................... B23B 31/28
                                                    279/114
(Continued)

FOREIGN PATENT DOCUMENTS

DE    102013201231 B3    2/2014
DE    102015102100 B3 *  6/2016 ....... B23B 31/16045
(Continued)

OTHER PUBLICATIONS

International Searching Authority, Search Report and Written Opinion issued in International Applicaiton PCT/EP2015/078464 dated Feb. 3, 2016 (11 pages).

*Primary Examiner* — Eric A Gates
(74) *Attorney, Agent, or Firm* — Wood Herron & Evans LLP (57) ABSTRACT

A power chuck includes a housing in which there is arranged a drive unit having a traction guide means moveable in the direction of a clamping axis. There are arranged two pairs of mutually diametrically opposite base jaws. The base jaws are guided radially, in the housing substantially perpendicularly to the clamping axis, and the drive unit is adapted to convert the movement of the traction guide means into the movement of the base jaws. According to the invention, it is proposed that the drive unit for each base jaw has a slider which is in engagement with the base jaw and which is moveable with a movement component on a circular path about the clamping axis.

16 Claims, 11 Drawing Sheets (52) U.S. Cl.
CPC ..... *B23B 2231/30* (2013.01); *Y10T 279/1291* (2015.01); *Y10T 279/1926* (2015.01); *Y10T 279/1973* (2015.01); *Y10T 279/25* (2015.01)

(58) Field of Classification Search
CPC ........ B23B 31/16254; B23B 31/16258; B23B 2231/22; B23B 2231/30; Y10T 279/1291; Y10T 279/1926; Y10T 279/1973; Y10T 279/25
See application file for complete search history.

(56) References Cited

U.S. PATENT DOCUMENTS

| | | | | |
|---|---|---|---|---|
| 2,860,881 | A * | 11/1958 | Perrachione | B23B 31/16012 279/114 |
| 2,921,796 | A * | 1/1960 | Ernest | B23B 31/16254 279/110 |
| 2,980,432 | A * | 4/1961 | Benson | B23B 31/16254 269/229 |
| 3,533,639 | A * | 10/1970 | Wright | B23B 31/16158 279/114 |
| 3,610,642 | A * | 10/1971 | Fischer | B23B 31/19 279/114 |
| 3,698,729 | A * | 10/1972 | Scharfen | B23B 31/1607 279/114 |
| 4,094,522 | A * | 6/1978 | Hiestand | B23B 31/1607 279/114 |
| 4,102,539 | A * | 7/1978 | Rohm | B23B 31/16079 279/114 |
| 5,143,686 | A * | 9/1992 | Shimizu | B23B 31/16004 279/110 |
| 6,089,577 | A * | 7/2000 | Takada | B23B 31/16254 279/121 |
| 6,655,699 | B2 | 12/2003 | Grobbel | |
| 9,156,092 | B2 | 10/2015 | Karlein et al. | |
| 2012/0319365 | A1 | 12/2012 | Grobbel et al. | |
| 2015/0352642 | A1 | 12/2015 | Meyer | |

FOREIGN PATENT DOCUMENTS

| | | |
|---|---|---|
| EP | 1332818 A2 | 8/2003 |
| EP | 1332818 A3 | 1/2004 |
| WO | 2011137884 A1 | 11/2011 |
| WO | 2011137884 A4 | 3/2012 |
| WO | 2011137884 A8 | 11/2012 |

* cited by examiner

POWER CHUCK

CROSS-REFERENCE TO RELATED APPLICATIONS

This application is a national phase entry of International Patent Application No. PCT/EP2015/078464, filed on Dec. 3, 2015, which claims priority to German Application No. 14196237.3, which was filed Dec. 4, 2014. These prior applications are incorporated herein by reference in their entireties.

TECHNICAL FIELD

The present invention concerns a compensation chuck for power clamping, comprising a housing in which is arranged a drive unit having a traction guide means moveable in the direction of a clamping axis and in which two pairs of mutually diametrically opposite base jaws are arranged, wherein the base jaws are guided preferably radially moveably in the housing substantially perpendicular to the clamping axis, and wherein the drive unit is adapted to convert the movement of the traction guide means into the movement of the base jaws. The compensation chuck according to the invention is adapted in particular for centric clamping of workpieces.

BACKGROUND

Chucks of the kind set forth in the opening part of this specification are also referred to as four-jaw chucks or four-jaw clamping chucks. Chucks for centric clamping are basically required whenever workpieces have to be clamped in machine tools for machining, in particular when they are machined in rotational mode. In modern manufacturing environments there is increasingly a need for clamping devices which can be used both for turning and also for milling. Accordingly the invention concerns a chuck for such purposes of use.

The reason for at all considering the use of four jaw chucks in comparison with three-jaw chucks is that, with a larger number of jaws which embracingly grip the workpiece, the spot load on each individual jaw is reduced. Consequently, with a larger number of jaws, the forces acting on the workpiece and consequently deforming the workpiece are more uniformly distributed around the periphery of the workpiece. That increases the dimensional accuracy of the workpiece after machining.

Four-jaw chucks are known from the state of the art, which provide for centric clamping. These however generally suffer from the disadvantage that they are only suitable for clamping round workpieces or have to be of a mirror-symmetrical configuration in both clamping jaw planes so that all four jaws can engage the workpiece when clamping it. By virtue of a lack of compensation, in respect of the workpiece geometry, such rigidly centrically clamping chucks involve only limited practical use in relation to "non-round" workpieces.

Four-jaw compensation chucks are also known from the state of the art, which however also suffer from crucial disadvantages. In the case of many four-jaw chucks with a compensation function the reproduction accuracy in terms of centric clamping is restricted.

WO2011/137884 A1 discloses for example a four jaw chuck having a compensation function in such a way that adjacent jaws of the chuck are coupled together by way of one or more rocker bars. If, when dealing with a workpiece which is not rotationally symmetrical, firstly a first pair of jaws is brought into contact with the workpiece while the other pair of jaws is not yet in contact therewith, the corresponding rocker bars are deflected and the second pair of jaws successively approaches the workpiece. That kinematic solution suffers from the disadvantage that, by virtue of the lever lengths which necessarily have to be tolerated between the drive force and the jaw there is a certain elasticity in the system and drive force losses occur. The high complexity in terms of the parts involved also makes the systems potentially susceptible to trouble.

A further approach for providing for compensation in four jaw chucks is to be found in the field of chucks which are actuated by power clamping. DE 10 2004 001 839 A1 discloses a four-jaw chuck in which the four chucks are pulled along conical slide surfaces by a clamping cylinder. A hydraulic or mechanical power deflection system leads to the displacement of conical compensation elements in opposite relationship to the clamping direction, which are intended to permit jaws which are not yet in contact with the workpiece to approach same. That system is viewed in particular as suffering from the disadvantage that the maximum possible compensation travel is extremely slight and the structural size of the clamping device overall is unacceptably high for certain purposes of use. In addition the system is again suitable for hand chucking operation.

The above-described disadvantages are addressed in DE 10 2013 201 231 B3. Described therein are four jaw chucks having a compensation function, which in some embodiments are designed for hand chucking operation but also for power chucking actuation. While the chucks presented therein have unlimitedly proven themselves in practice and afford a compensation function with a large compensation range with maintained centricity in the clamping operation there is nonetheless still a need to develop the existing technology. In particular there is a wish to develop a chuck which is more economical in manufacture and which as far as possible affords improved power transmission from the drive unit to the base jaws.

SUMMARY

With that background in mind the object of the invention is to improve a chuck of the kind set forth in the opening part of this specification, such that it can be more economically produced. In particular the object of the invention is also to further develop a compensation chuck such that the transmission of force to the base jaws is improved.

In a compensation chuck of the kind set forth in the opening part of this specification that object is attained by the invention in that the drive unit for each base jaw has an entrainment means which is in engagement with the base jaw and which is moveable on a circular path around the clamping axis. It has been realized in the context of the invention that arranging the drive members in a drive slide moved transversely relative to the clamping direction, which entailed a compensation movement by pivotal levers (thus in DE 10 2013 201 231 B3), admittedly with a high level of reproduction accuracy in operation, afforded the desired results, but also required a large number of parts and comparatively high production complexity. In accordance with the invention the term "substantially perpendicularly" is also used to mean deviations of +5o from the perpendicular.

It is here that the invention comes in insofar as provided for each base jaw is an entrainment means which, in addition to the movement of the base jaw substantially perpendicularly to the clamping axis, preferably radially, is also moveable on a circular path around the clamping axis. In that way it is possible to achieve numerous advantageous effects, as will be seen in particular also from the preferred embodiments set forth hereinafter.

Insofar as reference is made in accordance with the invention to a movement on a circular path of the sliders, that is used to denote a movement which has a movement component in the form of a circular path or which is tangential, but which can also have further components, for example axially and/or radially relative to the clamping axis.

In a first preferred development of the invention the drive unit for each base jaw has a slider which is moveable with a movement component on a circular path around the clamping axis. In a preferred alternative the drive unit has for a respective pair of base jaws a slider which is moveable with a movement component on a circular path around the clamping axis.

The sliders are coupled to the traction guide means, preferably by slide surfaces which bear against each other, in such a way that the clamping movement of the traction guide means causes a synchronous movement of diametrically opposite sliders. That movement is for example a preferably radial movement of the sliders towards each other, that is substantially perpendicular to the clamping axis.

Preferably the sliders each have a slide surface which extends at an angle to the clamping axis and the traction guide means has a corresponding contact surface extending at the same angle or at least one projection which comes to bear against the slide surfaces of the sliders and against which the sliders slide in a movement of the traction guide means in the direction of the clamping axis.

In a preferred embodiment of the invention the base jaws each have a respective sliding guide means which are in engagement with corresponding entrainment the sliders. Alternatively it is not the base jaws but the sliders that each have a respective sliding guide means in engagement with corresponding entrainment the base jaws.

In a further preferred embodiment sliding guide means is adapted in such a way that a rotation-free movement of the sliders causes a synchronous movement of diametrically opposite base jaws, and a movement of the sliders on a circular path around the clamping axis causes a relative movement of the second pair of base jaws relative to the first pair of base jaws.

Depending on the angle at which the sliding guide means is oriented relative to a radial line in the direction of the clamping axis, a higher or not so high force is required to move the sliders for sliding along the sliding guide means. Preferably the angle of the sliding guide means relative to the radial is only so selected that a sliding movement of the sliders along the sliding guide means is only triggered when the base jaws of a pair thereof are blocked in terms of their movement by an obstacle, in particular by engaging the tool to be gripped, by the jaws coupled to the base jaws. In such an embodiment the workpiece blocks a movement of the base jaws of the respective pair of base jaws while the other pair of base jaws is not yet in contact with the workpiece. In such a situation however the traction guide means pushes further in the direction of the clamping axis. Those sliders whose base jaws can already not be deflected further inwardly because they are already blocked by the workpiece now have no other choice whatsoever, in order to follow the traction guide means, but to slide laterally along the sliding guide means. In that case the sliders are deflected with a movement component on a circular path.

Preferably the sliders are positively synchronized in respect of their movement on the circular path, and can therefore be respectively moved only in the same direction, in particular uniformly, on a circular path.

In a further preferred embodiment the entrainment means are mounted rotatably to the sliders, preferably about an axis parallel to the clamping axis. Alternatively, if the entrainment means are not arranged on the sliders but on the base jaws, preferably the entrainment means are mounted rotatably to the base jaws, preferably about an axis parallel to the clamping axis. Rotatably mounting the entrainment means in their respective associated component avoids jamming of the entrainment means in the sliding guide means in the compensation movement of the sliders on the circular path.

In a further preferred configuration of the invention the traction guide means is of a one-piece structure, in particular in the form of a ring body which is rotatable about the clamping axis and to which the sliders are coupled. If all sliders are coupled to the same rotatable ring body, this ensures that the sliders all move together to implement the compensation function on a circular path. Depending on the clamping state the radius of the circular path will be larger or smaller as the sliders are also all moved synchronously towards the clamping axis by the traction guide means at any event until a first obstacle is reached in the clamping movement.

In an alternative configuration the traction guide means has a plurality of segments which are moveable for example on a circular path around the clamping axis and to which one or more of the sliders are respectively coupled.

In a further preferred embodiment of the invention the sliders are respectively arranged guided moveably in a corresponding slider receiving the traction guide means.

For operation of the power chuck according to the invention the traction guide means preferably has a receiving means for a traction tube. The traction tube can be connected for example to a hydraulically actuated clamping device.

In addition preferably the traction guide means has a traction ring for enclosing the traction tube in the receiving means.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

DETAILED DESCRIPTION

Figure 1:
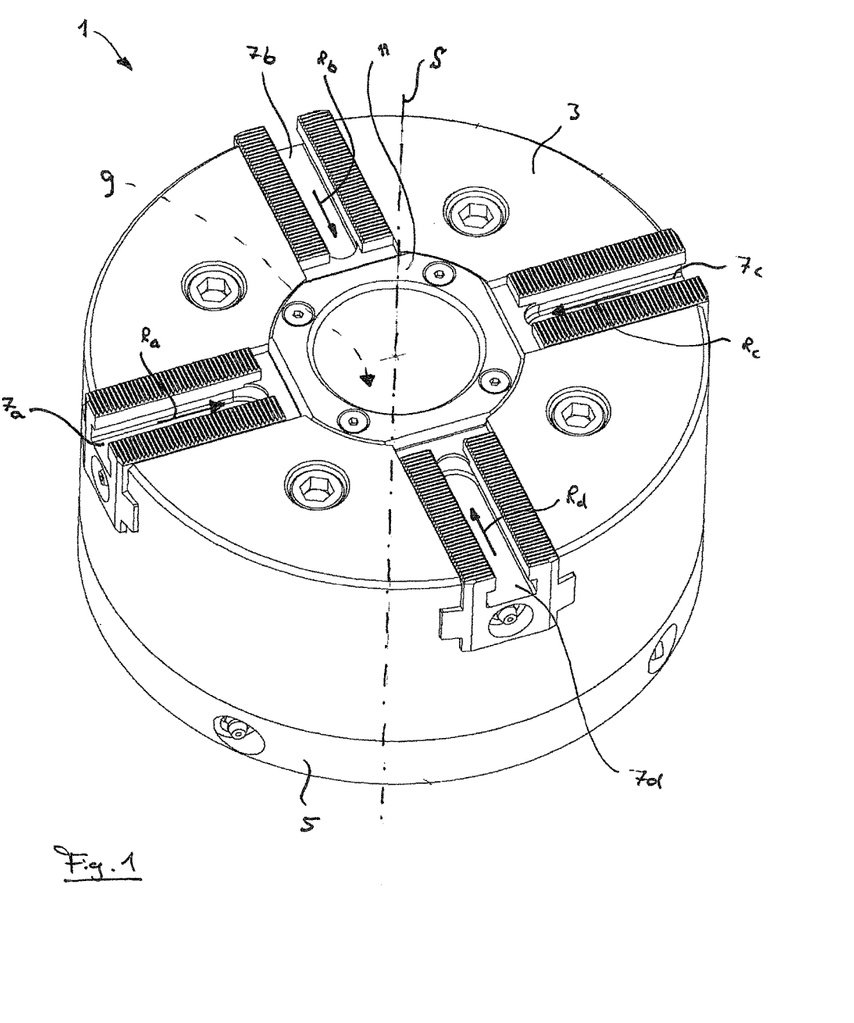
FIG. 1 shows an overall view of a compensation chuck according to a first preferred embodiment of the invention.

A compensation chuck 1 according to the first preferred embodiment of the present invention is shown in FIG. 1. The chuck 1 has a housing 3 mounted on a lower housing portion 5. Provided in the housing are respective guide means in which a total of four base jaws 7a-7d are received moveably guided. The base jaws 7a and 7c form a first pair of base jaws. The base jaws 7b, 7d form a second pair of base jaws. The base jaws of the respective pairs 7a, 7c and 7b, 7d are respectively arranged in mutually diametrically opposite relationship.

The housing 3 is covered with a housing cover which is in the form of a dirt protection tube and which conceals a view on to a drive unit 9. The movement of a traction tube (see below in relation to FIGS. 3a, 3b) in the direction of the clamping axis S is converted by the drive unit 9 into the movement, predetermined by the housing, of the base jaws 7a-7d in the direction of the arrows Ra-Rd. The internal structure of the drive unit 9 can be particularly clearly seen from FIGS. 2a and b.

Figure 2A:
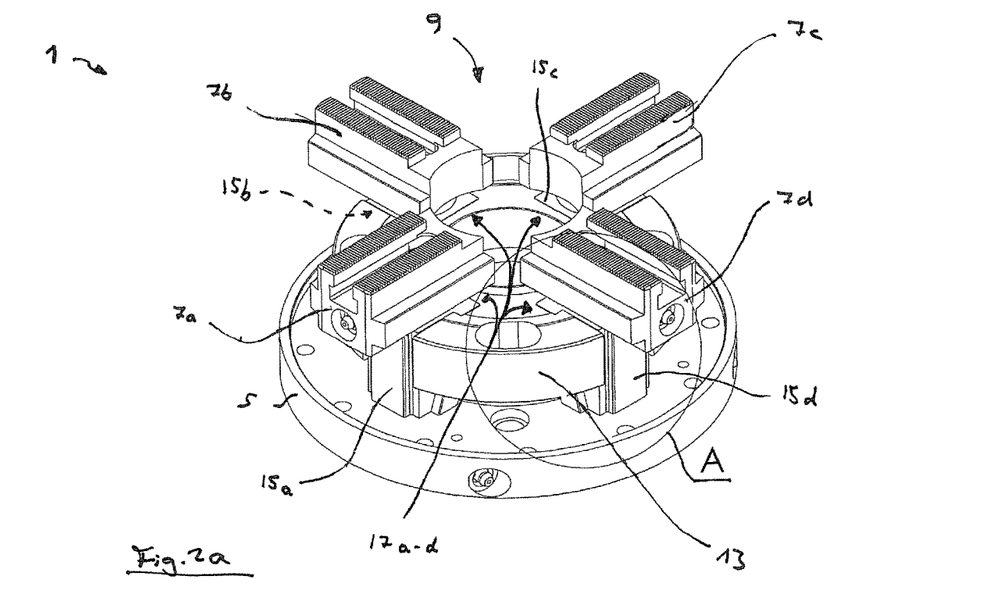
FIG. 2a shows a perspective view of the chuck of FIG. 1 in a partly assembled state.
Figure 2B:
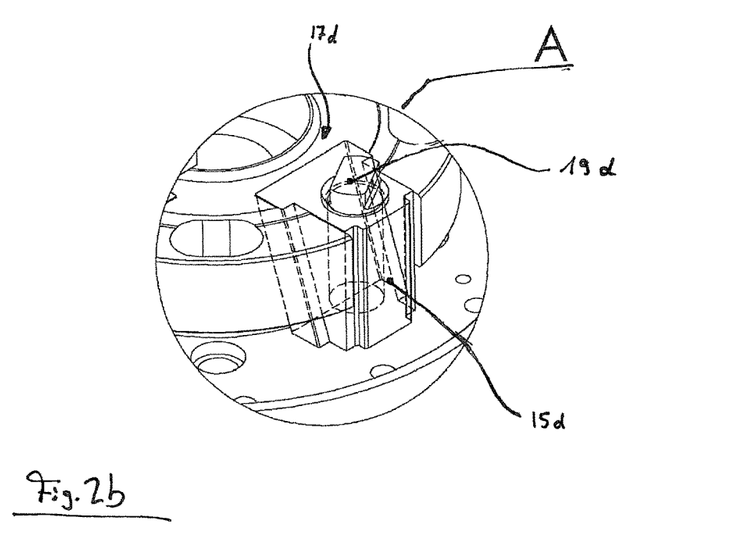
FIG. 2b shows a detail view of FIG. 2a, FIG. 3a shows a side view of the chuck of FIG. 1 in partial section.

FIG. 2a firstly shows a perspective view of the compensation chuck 1 without the housing. In regard to references used in identical fashion, attention is directed to FIG. 1. The drive unit 9 has a traction guide means 13. The traction guide means 13 is in the form of a one-piece ring body in this embodiment. A total of four sliders 15a, 15b, 15c and 15d are coupled to the traction guide means 13. The plurality of sliders 15a-15d are respectively slidingly received in a slider receiving means 17a-17d (shown as elongated grooves in the embodiment shown in the figures), see also FIG. 2b. When the traction guide means 13 is moved in the direction of the clamping axis S the sliders 15a-15d are deflected in the receiving means 17a-17d, inwardly or outwardly, by virtue of slide surfaces bearing against each other, in dependence on the direction of movement of the traction guide means 13. The sliders 15a-15d are respectively in engagement with the base jaws 7a-7d by an entrainment means 19a-19d (see FIG. 4), shown as connecting members in the embodiment shown in the figures. The precise interplay between sliders and base jaws will be further described in detail hereinafter with reference to FIG. 4.

Figure 3A:
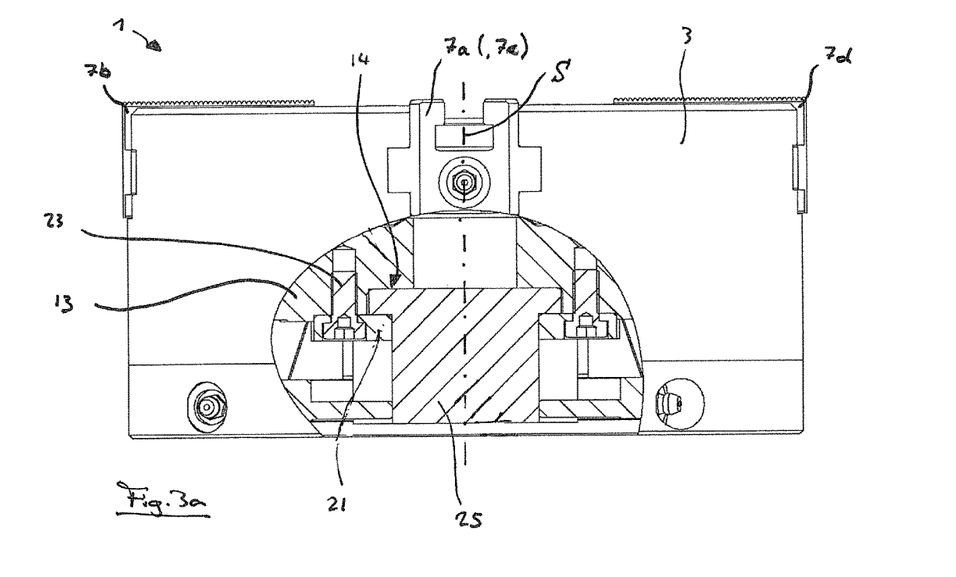

The drive for the traction guide means 13 is described in greater detail with reference to FIGS. 3a, 3b. As can firstly be seen from FIG. 3a the traction guide means 13 is provided with a receiving means 14 (shown as a receptacle within the chuck 1 in the embodiment shown in the figures) for a traction tube 25. In the view in FIG. 3a the traction tube 25 is fitted into the receiving means 14 and fixed there by a traction ring 21. The traction ring 21 is fixed in the traction guide means 13 by a plurality of screws 23. Preferably the traction tube 25 is received in the receiving means 14 with some play in the direction of the clamping axis S so that possible rotational movement of the traction guide means 13 is not impeded by the traction tube. In preferred configurations (not shown here) sliding means and/or axial thrust bearings can be provided for minimizing friction between the traction ring 21 and the traction tube 25.

Figure 3B:
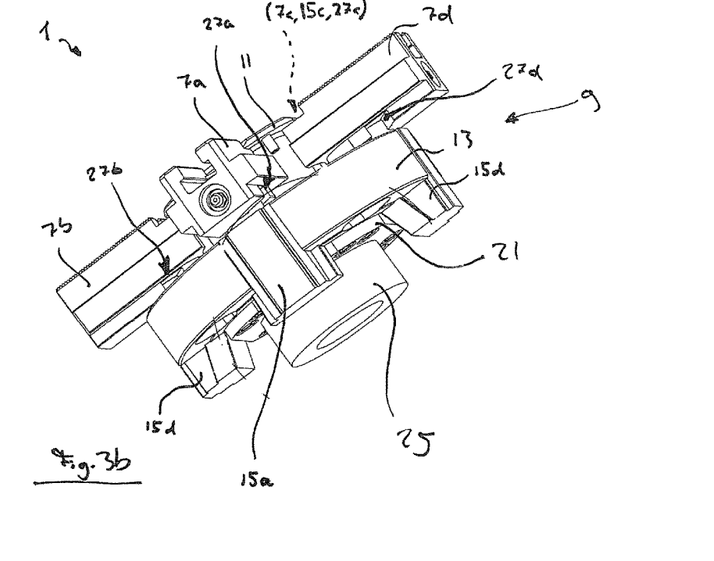
FIG. 3b shows a further perspective view of the chuck of FIGS. 1 and 2.

Referring now to FIG. 3b the basic operation of the compensation chuck 1 is as follows: if the traction tube 25 is moved in the direction of the clamping axis S (see FIG. 1) the traction guide means 13 is also moved in the same direction. As a result the sliders 15a-15d are moved in their slider receiving means 17a-17d (see FIGS. 2a, 2b) relative to the traction guide means 13 and therewith the entrainment means 19a-19d (see FIGS. 2b and 4). The entrainment means are in engagement with a respective one of the sliding guide means 27a-27d (shown as elongated slots in the embodiment shown in the figures) provided in the base jaws 7a-7d. Due to the engagement of the entrainment means 19a-19d in the sliding guide means 27a-27d both the transmission of force to the base jaws 7a-7d in the direction of the arrows Ra, Rb, Rc, Rd (FIG. 1) and also a compensation movement of the base jaws among each other is implemented. That is described in greater detail with reference to FIG. 4.

Figure 4:
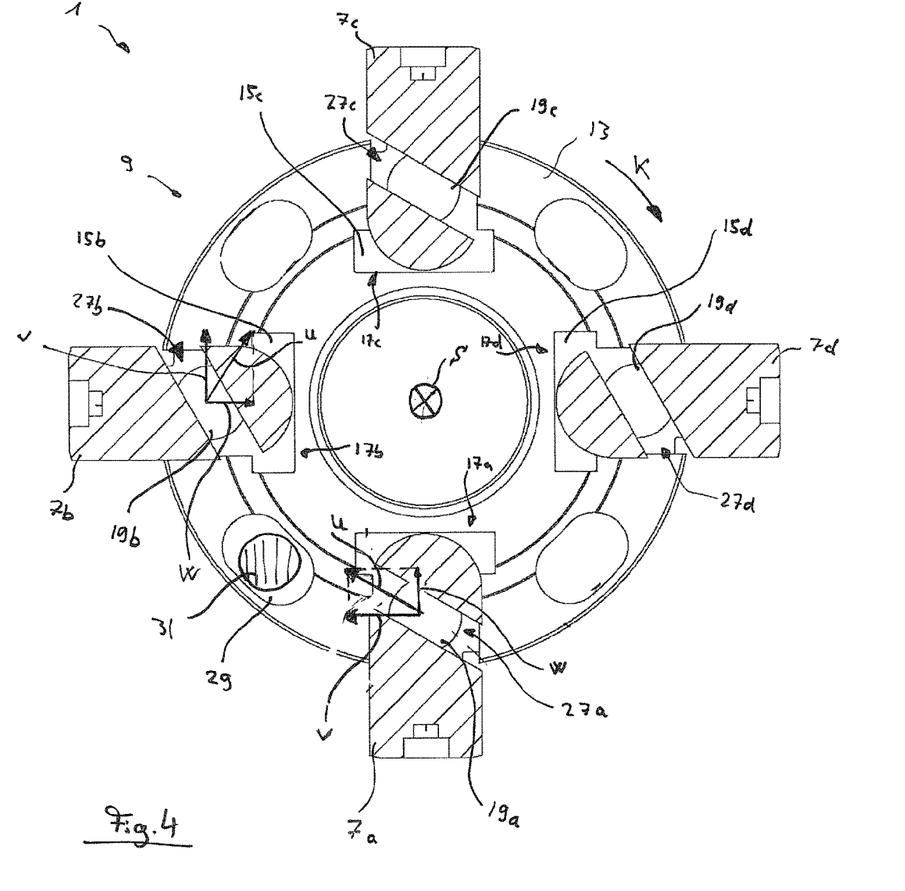
FIG. 4 shows a plan view of the chuck of FIG. 3a, in particular perpendicularly to the view in FIG. 3a, with a partial section.

The cross-sectional view through the base jaws 7a-7d in FIG. 4, in the case of the compensation chuck 1, also affords a view of the engagement of the entrainment means 19a-19d in the sliding guide means 27a-27d.

The traction guide means 13 is moveable in the direction of the arrow K on a circular path around the clamping axis S. As the sliders 15a-15d can perform a centric, namely radial, movement (besides the axial sliding movement in the direction of the slide surfaces), by way of their slider receiving means 17a-17d exclusively relative to the traction guide means 13 the sliders 15a-15d thus necessarily rotate with a movement component with the traction guide means 13. In the arrangement shown in FIG. 4 the sliding guide means 27a, 27c of the first pair of base jaws 7a, 7c are oriented for example "counter-clockwise" while the sliding guide means 27b, 27d of the second pair of base jaws 7b, 7d are oriented in opposite relationship, that is, to say "clockwise".

The compensation function of the chuck 1 in accordance with the invention is described hereinafter. The following situation is taken as the basic starting point: the base jaws 7a, 7b, 7c, 7d are firstly moved synchronously inwardly by a movement of the traction guide means 13 in the direction of the clamping axis S, that is, to say into the plane of the illustration in FIG. 4. By virtue of the respective angle of inclination of the sliding guide means 27a-27d a sliding movement of the base jaws on the entrainment means 19a-19d has not yet occurred in particular because of static friction.

In the view in FIG. 4 it is now assumed that the first pair of base jaws 7a, 7c, by virtue of contact of the jaws (not shown) connected to the base jaws 7a, 7c with the workpiece, can no longer move further inwardly (in the direction of the arrows Ra, Rc in FIG. 1).

If therefore the two base jaws 7a, 7c are now stationary and the traction guide means 13 pushes further in the direction of the clamping axis S, then there is no other option for the entrainment means 19a, 19c than to slide in the sliding guide means 27a, 27c in the direction of the arrow u. The movement of the traction guide means 13 can be continued by that sliding movement of the entrainment means 19a, 19c in the direction of the arrow u. At the same time the traction guide means 13 is rotated in the direction of the arrow K with the movement component v whereby the sliders complete a kind of screw movement.

As all entrainment means 19a, 19b, 19c, 19d are connected to the traction guide means 13 the entrainment means 19b, 19c are also further moved in the direction of the arrow u. Because however the base jaws 7b, 7d of the second pair of base jaws are not yet impeded in movement (because the jaws coupled to the two base jaws 7b, 7d do not yet bear against the workpiece) they can continue their movement towards the clamping axis S until those two base jaws cannot be further moved by virtue of the contact of the respective jaws with the workpiece.

The size of the compensation range can be controlled by way of the angles of the sliding guide means 27a-27d and the maximum sliding distance that the entrainment means 19a-19d can cover in the sliding guide means 27a-27d.

The compensation chuck 1 in accordance with the first preferred embodiment is based on the fundamental idea that a separate slider 15a-15d was allocated to each base jaw 7a-7d, each said separate slider being respectively moved by a ring-shaped traction guide means 13. The compensation chuck 101 described hereinafter in accordance with the second embodiment exhibits the mode of functioning or compensation which in principle is the same, but makes use of a different association between the base jaws and the sliders, as is described hereinafter.

Figure 5:
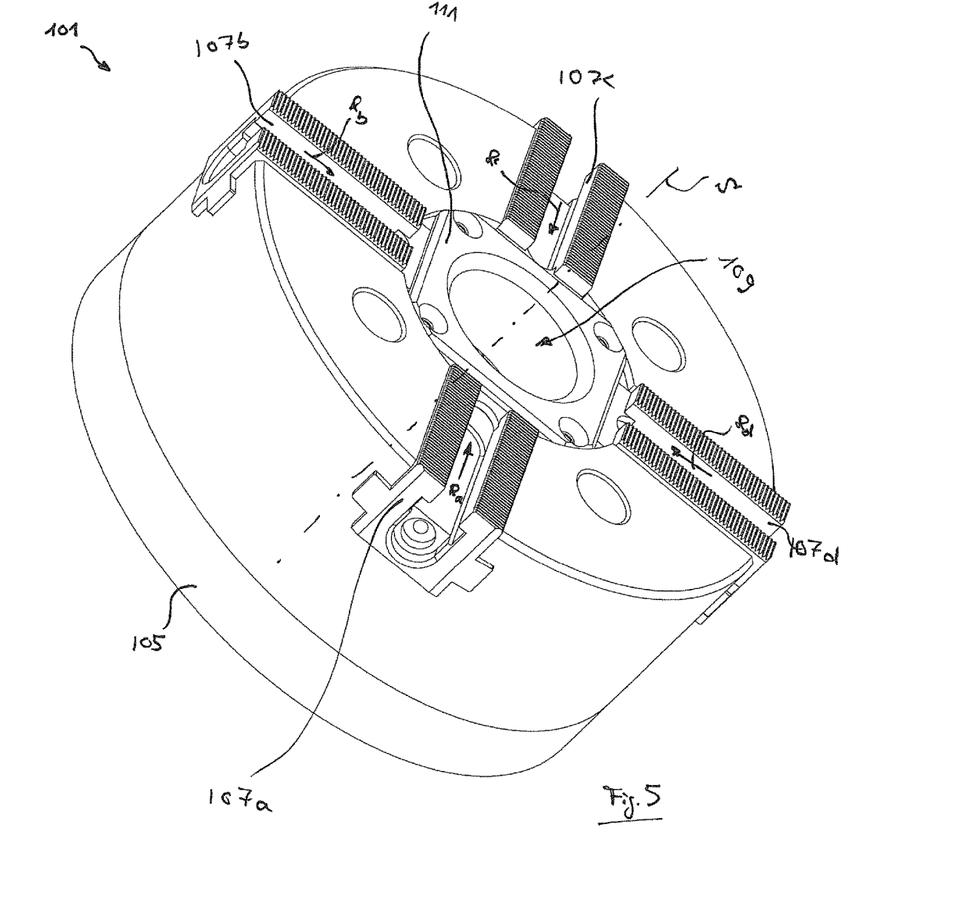
FIG. 5 shows an overall view of a compensation chuck according to a second preferred embodiment.

The compensation chuck 101 has a housing 103 mounted on a lower housing portion 105. Provided in the housing are respective guide means, in which a total of four base jaws 107a-107d are moveably received in a guided manner. The base jaws 107a and 107c form a first pair of base jaws while the base jaws 107b, 107d form a second pair. The base jaws of the respective pairs 107a, 107c and 107b, 107d are respectively arranged in mutually diametrically opposite relationship.

The housing 103 is covered with a housing cover 11 which is in the form of a dirt protection tube and beneath which a drive unit 109 is arranged. The movement of a traction tube in the direction of the clamping axis S is converted by the drive unit 109 into the movement, predetermined by the housing, of the base jaws 107a-107d in the direction of the arrows Ra through Rd. The internal structure of the drive unit 109 can be particularly clearly seen from following FIGS. 6a through 9b.

Figure 6A:
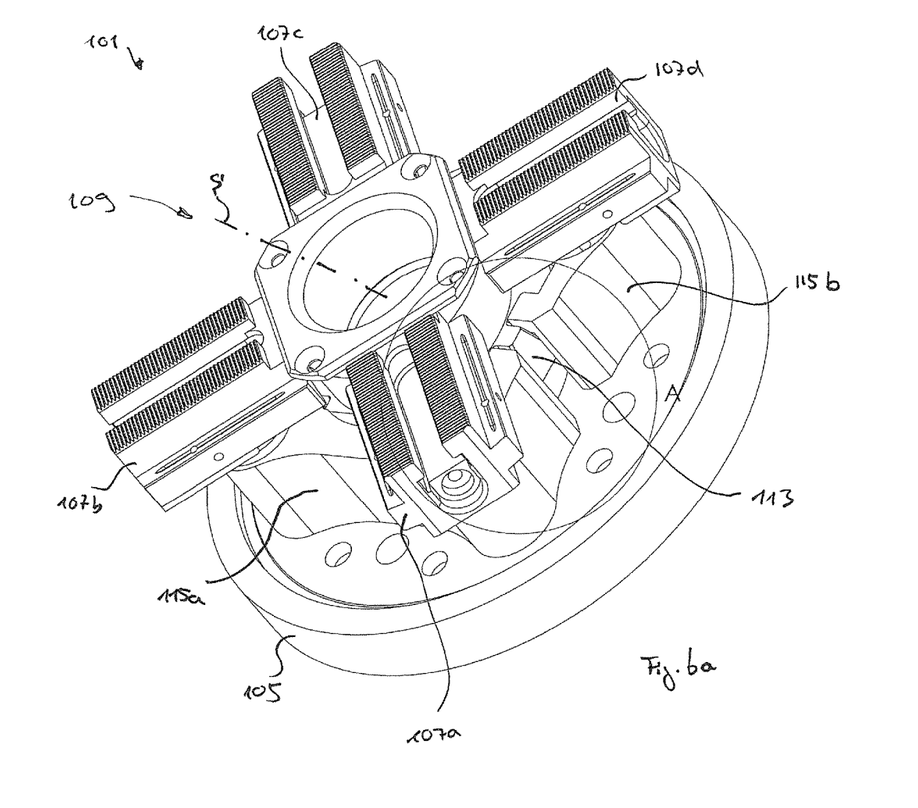
FIG. 6a shows a perspective view of the chuck of FIG. 5 in a partly assembled state.

FIG. 6a firstly shows a perspective view of the compensation chuck 101 without the housing 3. In regard to references used in identical fashion attention is directed to FIG. 5. The drive unit 109 has a traction guide means 113. The traction guide means 113 is of a one-piece nature. Overall two sliders 115a, 115b are coupled to the traction unit 113. The sliders 115a, 115b are respectively slidingly received in a slider receiving means 117a, 117b, see in particular FIG. 6b.

Figure 6B:
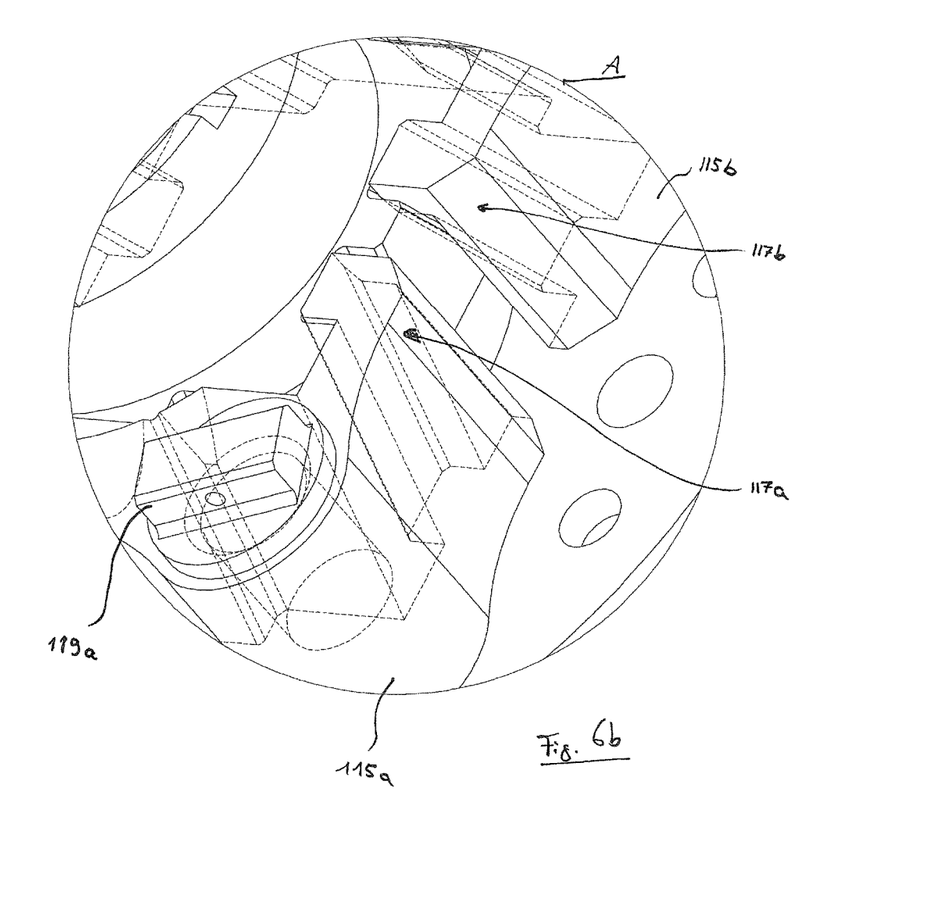
FIG. 6b shows a detail view of FIG. 6a, FIG. 7 shows a further perspective view of the chuck of FIGS. 5, 6a and 6b in a partly assembled state.

If the traction guide means 113 is pulled in the direction of the clamping axis S, the sliders 115a, 115b are deflected in the receiving means 117a, 117b by virtue of corresponding slide surfaces bearing against each other, and move towards or away from each other, depending on the direction of movement of the traction guide means 113.

Figure 7:
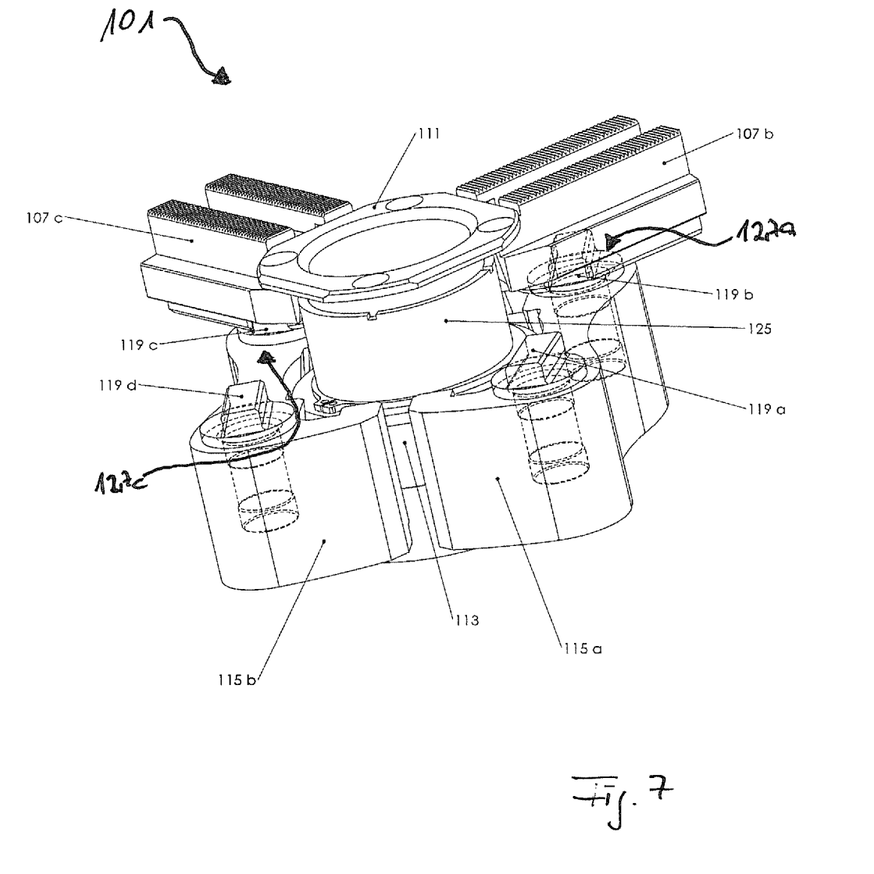
Figure 8:
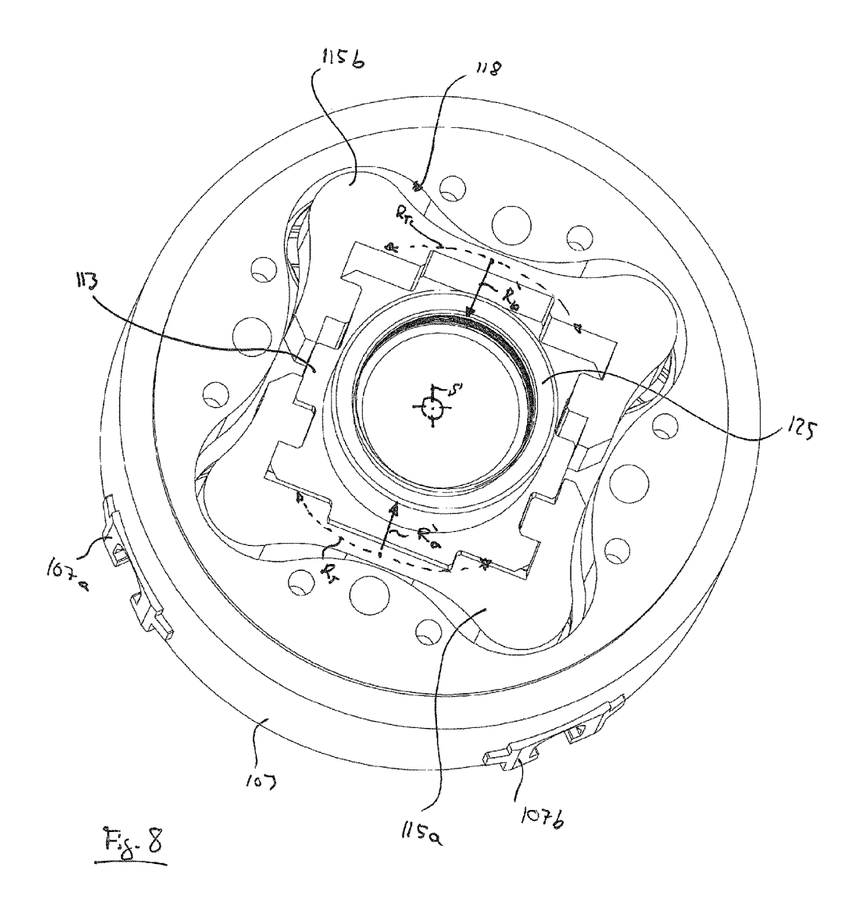
FIG. 8 shows a perspective view of the chuck of FIGS. 5 and 7 from below.
Figure 9A:
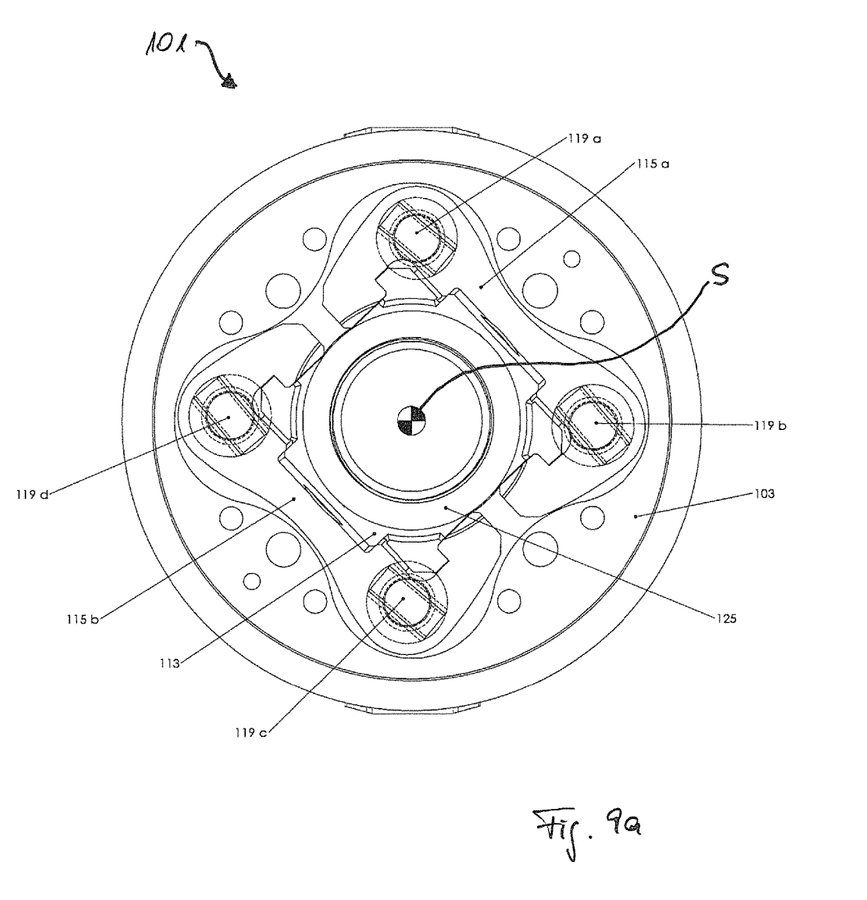
FIG. 9a shows a plan view of the chuck of FIGS. 5 through 8 from above.

The sliders 115a, 115b each have two entrainment means 119a, 119b and 119c, 119d mounted rotatably thereon (see FIGS. 7 and 9a). The entrainment means 119a-119d are respectively in engagement with sliding guide means 127a-127d of the base jaws 107a-107d.

If in operation of the compensation chuck 101 the traction tube 125 is pulled in the direction of the clamping axis S the sliders 115a, 115b move with a movement component in the direction of the arrows R'a, R'b. In addition the traction guide means 113 and therewith the sliders 115a, 115b are however mounted rotatably in the housing 103. Thus it is possible that, as soon as a first pair of base jaws 107a, 107c or 107b, 107d meets an obstacle, for example in the form of the workpiece, in the clamping movement, the traction guide means 113 performs an additional movement component in the direction of the indicated arrows RT. As a consequence of that rotational movement which is made possible by suitable relief areas 118 in the housing 103 the situation involves an unequal movement of the base jaws 107a-107d, whereby the compensation function is guaranteed similarly to the compensation chuck 1 in accordance with the first preferred embodiment. The interplay between entrainment means 119a-119d and base jaws 107a-107d is also shown once again in FIGS. 9a-9d.

The entrainment means 119a, 119b and 119c, 119d mounted rotatably in the sliders 115a, 115b slide in the openings 127a-127d in the base jaws 107a-107d while the compensation chuck is being tightened.

Figure 9B:
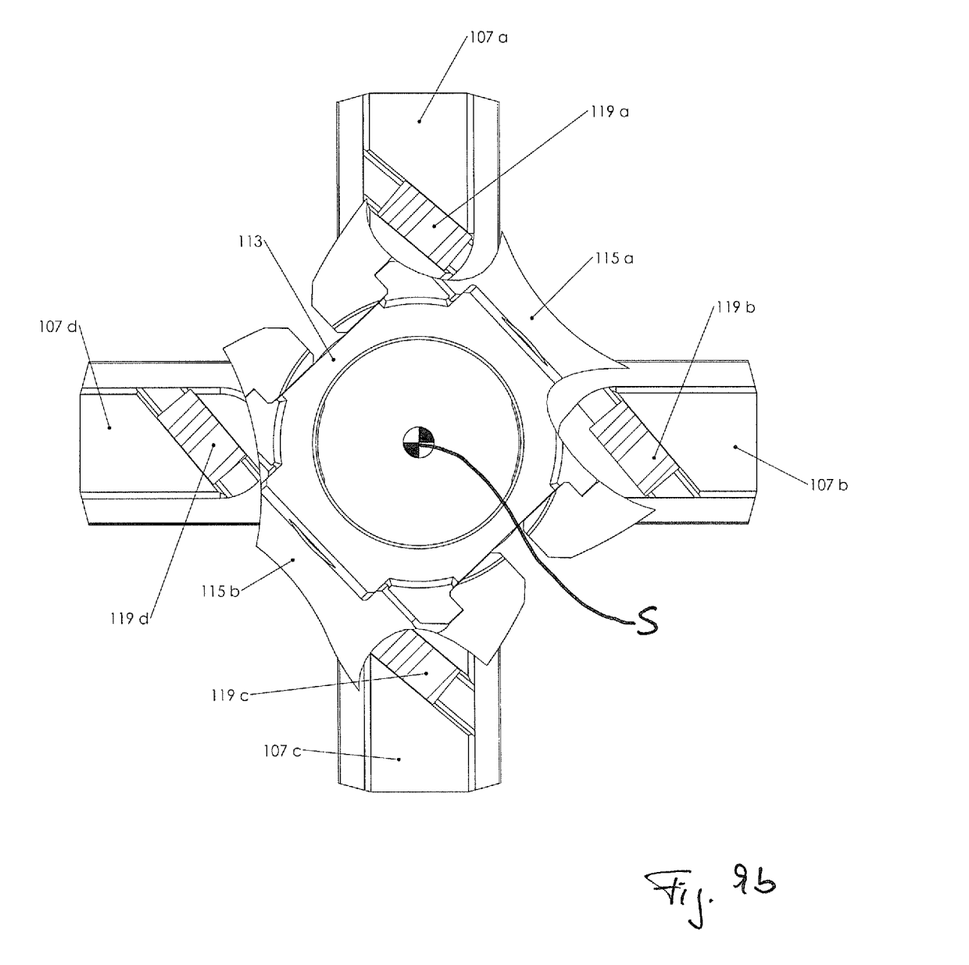
FIG. 9b shows a side view of the base jaws of the chuck of FIGS. 5 through 9a from below.

As soon as the rotation-free movement of the traction guide means 113 is no longer possible because of a first obstacle they necessarily begin to move by virtue of the continued clamping movement by the traction tube 125, in addition with a movement component in the direction of the arrow K (FIG. 9b). As a result, and due to the different angles of incidence of the sliding guide means 127a, 127b, 127c, 127d in the respective pairs of base jaws 107a, 107c and 107b, 107d, it is now no longer the case that all base jaws move synchronously towards each other. Instead, one pair of base jaws will move more rapidly or more slowly than the other pair of base jaws, for example if one of the pairs of base jaws is already fixed by making contact with the workpiece.

In an overview of the foregoing description relating to the preferred embodiments it will be once again clear that a reliable centric clamping and compensation function, with at the same time a markedly reduced level of component complexity, is made possible, in comparison with the state of the art. That is crucially achieved by the fact that the sliders are moveable for compensation on a circular path around the clamping axis S, in particular by virtue of coupling to the traction guide means 13 and 113 respectively.

The preferred embodiments respectively represent particularly preferred combinations of features of the preferred configurations of the invention.

In the context of the invention however various other sub-combinations of the preferred embodiments by way of example with the features of a chuck of the kind set forth in the opening part of this specification, are to be understood as constituting separate technical aspects which can also be separately worthy of protection. Accordingly the scope of this application also includes further combinations of features.

The functional principle in other words can be summarized as follows:

As was discussed hereinbefore the chuck has substantially a housing with four base jaws (clamping locations) and a drive which combines a traction tube, a traction guide means mounted rotatably thereon and a sliding transmission means having at least two mutually opposite sliders. In the clamping operation all sliders are moved towards or away from the center. They are mounted in such a way that a mirror-symmetrical movement about the center is possible. Entrainment means which are mounted rotatably in the sliders transmit the movement by way of a sliding transmission means to a respective base jaw (clamping location). The control groove of the base jaw (clamping location) is so arranged that, upon a rotary movement of the drive, the spacing between a pair of base jaws is reduced and the spacing between the other pair of base jaws is increased. The mutually diametrically oppositely disposed base jaws are referred to as pairs of base jaws. If during the movement of the base jaws towards the center or away from the center a pair of base jaws encounters a resistance the entrainment the same pair of base jaws are guided in the control groove thereof in such a way that the drive rotates about the center, in which case the entrainment means in the control grooves of the other pair of base jaws provide for a continuation of the movement towards or away from the center until that pair of base jaws also encounters a resistance.

The forgoing is merely preferred embodiments of the present invention and not intended to limit the patent scope of the present invention, and any equivalent structures or equivalent flow variations made by using the description and accompanying drawings of the present invention, no matter whether it is directly or indirectly used in any other related technical field, should be included within the protection scope of the present invention.

What is claimed is:

1. A power chuck comprising:
   a housing in which there is arranged a drive unit having a traction guide means moveable in a direction of a clamping axis, and there are arranged two pairs of mutually diametrically opposite base jaws,
   wherein the base jaws are guided moveably in the housing substantially perpendicularly to the clamping axis,
   the drive unit is adapted to convert the movement of the traction guide means into movement of the base jaws, and
   wherein the drive unit for each base jaw has an entrainment means which is in engagement with the base jaw and which is moveable with a movement component on a circular path about the clamping axis.

2. The power chuck as set forth in claim 1, wherein the drive unit for each base jaw has a slider which is moveable with a movement component on a circular path around the clamping axis, thereby defining a plurality of sliders for the power chuck.

3. The power chuck as set forth in claim 2, wherein the plurality of sliders are coupled to the traction guide means by slide surfaces which bear against each other, in such a way that a clamping movement of the traction guide means causes a synchronous movement of pairs of the plurality of sliders that are diametrically diametrally opposite one another.

4. The power chuck as set forth in claim 3, wherein the synchronous movement is defined by a radial movement of the plurality of sliders towards each other, in a direction that is substantially perpendicular to the clamping axis.

5. The power chuck as set forth in claim 2, wherein the base jaws each has a respective sliding guide means which are in engagement with a corresponding one of the entrainment means.

6. The power chuck as set forth in claim 5, wherein the sliding guide means is adapted to such a way that:
   a rotation-free movement of the plurality of sliders causes a synchronous movement of the diametrically opposite base jaws, and
   a movement of the plurality of sliders on a circular path around the clamping axis causes a relative movement of a second pair of the two pairs of diametrically opposite base jaws relative to a first pair of the two pairs of diametrically opposite base jaws.

7. The power chuck as set forth in claim 2, wherein the plurality of sliders each has a respective sliding guide means which are in engagement with a corresponding one of the entrainment means.

8. The power chuck as set forth in claim 1, wherein the drive unit for a respective pair of base jaws has a slider which is moveable with a movement component on a circular path about the clamping axis, thereby defining a plurality of sliders for the power chuck.

9. The power chuck as set forth in claim 1, wherein the entrainment means are mounted rotatably at the plurality of sliders and/or at the base jaws.

10. The power chuck as set forth in claim 9, wherein the entrainment means are mounted rotatably about an axis parallel to the clamping axis.

11. The power chuck as set forth in claim 1, wherein the traction guide means is of a one-piece unitary structure.

12. The power chuck as set forth in claim 11, wherein the traction guide means is in the form of a ring body which is rotatable about the clamping axis and to which the plurality of sliders are coupled.

13. The power chuck as set forth in claim 1, wherein the plurality of sliders are respectively arranged so as to be guided moveably in a corresponding slider receiving means of the traction guide means.

14. The power chuck as set forth in claim 1, wherein the traction guide means has a receiving means for a hydraulically actuated traction tube.

15. The power chuck as set forth in claim 14, wherein the traction guide means has a traction ring for enclosing the traction tube in the receiving means.

16. The power chuck as set forth in claim 1, wherein the base jaws are guided radially in the housing substantially perpendicularly to the clamping axis.

* * * * *

UNITED STATES PATENT AND TRADEMARK OFFICE
CERTIFICATE OF CORRECTION

Page 1 of 1

PATENT NO. : 10,183,336 B2
APPLICATION NO. : 15/527231
DATED : January 22, 2019
INVENTOR(S) : Volker Henke It is certified that error appears in the above-identified patent and that said Letters Patent is hereby corrected as shown below:

In the Claims

At Claim 3, Column 9, Line 46, reads "sliders that are diametrically diametrally opposite one" and should read -- sliders that are diametrically opposite one --

At Claim 5, Column 10, Lines 1-2, read "The power chuck as set forth in claim 2, wherein the base jaws each has a respective sliding guide means which" and should read -- The power chuck as set forth in claim 2, wherein each base jaw has a respective sliding guide means which --

At Claim 6, Column 10, Line 6, reads "sliding guide means is adapted to such a way that:" and should read -- sliding guide means is adapted in such a way that: --

At Claim 7, Column 10, Line 16, reads "plurality of sliders each has a respective sliding guide means" and should read -- plurality of sliders each have a respective sliding guide means --

Signed and Sealed this
Nineteenth Day of March, 2019

Andrei Iancu
*Director of the United States Patent and Trademark Office*